(12) United States Patent
Yoshizako et al.

(10) Patent No.: US 7,225,916 B2
(45) Date of Patent: Jun. 5, 2007

(54) BELT CLEANER

(75) Inventors: Kageyoshi Yoshizako, Sakai (JP);
Masahiro Uchida, Sakai (JP);
Nobuyoshi Fujisaki, Osaka (JP)

(73) Assignee: Nippon Tsusho Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/376,059

(22) Filed: Mar. 16, 2006

(65) Prior Publication Data
US 2006/0225990 A1    Oct. 12, 2006

(30) Foreign Application Priority Data
Apr. 12, 2005    (JP)    ............. 2005-114081

(51) Int. Cl.
*B65G 45/12*    (2006.01)
(52) U.S. Cl. ............. 198/497; 198/494; 198/499; 15/256.5; 474/92
(58) Field of Classification Search ............. 198/494, 198/497, 499; 15/256.5; 474/92
See application file for complete search history.

(56) References Cited
U.S. PATENT DOCUMENTS

| | | | |
|---|---|---|---|
| 4,598,823 A | 7/1986 | Swinderman | |
| 5,088,965 A | 2/1992 | Swinderman et al. | |
| 6,082,524 A * | 7/2000 | Brink | 198/499 |
| 6,457,575 B2 * | 10/2002 | Swinderman | 198/499 |
| 6,591,969 B2 * | 7/2003 | Swinderman et al. | 198/497 |
| 2004/0134757 A1 * | 7/2004 | DeVries et al. | 198/497 |

\* cited by examiner

*Primary Examiner*—Gene O. Crawford
*Assistant Examiner*—Leslie A. Nicholson, III
(74) *Attorney, Agent, or Firm*—David S. Safran (57) ABSTRACT

A belt cleaner device is provided in which assembling of a frame and a cleaner head may be performed easily and quickly.

A belt cleaner device comprises a frame 3 and one or more cleaner heads 1. The frame 3 includes a support face (3a) on its upper surface, and a support hole (33) through the frame. The cleaner head (1) includes a contact face (14) on its undersurface, and an anchor (16) projecting downward from the contact face (14). The cleaner head (1) is supported so as not to be rotated about the running direction of the belt by contacting the contact face (14) and the support face (3a) with each other. The cleaner head (1) is fixed to the frame (3) by fixedly inserting the anchor (16) in the support hole (33).

The cleaner head (1) further provides a concave (21) in at least one of the front and rear walls (13) (15) to form a strike seat (22) at the bottom of the concave (21). The strike seat (22) is struck with a hammer or the like so that the anchor (16) is pressed and inserted in the support hole (33).

5 Claims, 14 Drawing Sheets

BELT CLEANER

FIELD OF THE INVENTION

The present invention relates to a belt cleaner device for a conveyor belt by which the leavings of conveying material, e.g. cokes or the like stuck on the surface of the conveyor belt are removed.

BACKGROUND OF THE INVENTION

Conventionally, a belt cleaner device is installed adjacent to a conveyor belt in a manner that a frame on which cleaner heads are mounted is fixed to a pair of brackets. The cleaner head is provided with a scraping portion at the upper end. The scraping portion contacts with the surface of conveyer belt. While the conveyer belt is running in a circle between pulleys, the leavings on the belt surface are scraped off by the scraping portion.

The cleaner heads are attached to the frame with bolts or the like. For example, two or more bolts are implanted in the lower part of the cleaner head. Each bolt is inserted through the corresponding hole of the frame, and nuts are put firmly on said bolts from the back side of the frame. Therefore, the work for assembling the cleaner head to the frame is very complicated. When attaching two or more cleaner heads side by side in the transverse direction of the conveyor belt, the assembling work takes time.

The present invention provides a belt cleaner device for the purpose of solving the above-mentioned problem. According to the present invention, it does not need the work at the back of frame for attaching cleaner heads to the frame. The present invention offers a belt cleaner device which can be assembled very easily.

SUMMERY OF THE INVENTION

The present invention provides a belt cleaner device comprising a frame extending in the transverse direction of a conveyer belt, and one or more cleaner heads carried along with the frame. A scraping portion at the upper end of said cleaner head contacts with the surface of conveyer belt. The leavings on the belt surface are scraped off by the scraping portion and fallen through the front wall of the cleaner head. The frame provides a flat support face on the upper surface thereof and support holes there-through, each hole opens to the support face. The cleaner head is provided with a flat contact face which contacts with said flat support face of the frame. Therefore, the cleaner head is supported so as not to be rotated about the running direction of the conveyer belt. The cleaner head is also provided with an anchor which projects from said contact face. The anchor is inserted through the support hole by pressing and then engaged with the support hole at its outer edge for example. The cleaner head forms a concave on at least one of said front wall and the opposite rear wall of the cleaner head. The concave provides a strike seat in the bottom of the concave. The anchor is pressed fit in the support hole by striking said strike seat with a hammer or the like through the concave. As a result of the anchor is locked by the support hole, the cleaner head is firmly attached to the frame.

According to the present invention, the anchor of the cleaner head is provided with a leg which extends downward from said contact face and a nail which is bent from the end of the leg. The leg is inserted through the support hole with pressure, and the nail engages with the undersurface of the frame.

Both of the leg and the nail, or at least the leg, is preferably formed integral with the cleaner head by one-molding process with an elastic material. In this case, the anchor is formed with the cleaner head as one elastic structure. When the strike seat is struck with a hammer or the like, the anchor is deformed resiliently and inserted into the support hole, and restores to its original shape as soon as the nail moves out the support hole. The nail engages with the undersurface of the frame by a snap back motion of the leg. Furthermore, cost can be reduced by carrying out integral molding of the anchor with the cleaner head. The cleaner head of elastic material can absorb vibration of the running conveyer belt by its elastic deformation.

According to the present invention, the frame includes supporting means that has a rectangular shape in cross section which forms said support face and the undersurface on the up-and-down sides, and forms another flat face on at least one side of the front and the back sides. The cleaner head is provided with a holding portion suspended from the contact face. The holding portion holds the front or back flat face of the frame under the state that the anchor is inserted through the support hole and fixed to engage with the frame. Thereby, rotation of the cleaner head is prevented about the running direction of the conveyer belt. The contact face of the cleaner head does not apart from the support face of the frame.

According to the present invention, the cleaner head is mounted so that the rear wall may be aligned with a vertical line. In this state, the scraping portion is contacted with the portion of conveyor belt winding around the pulley, especially at the belt portion facing downward on the pulley. The vertically positioned rear wall of the cleaner head opposes against the load applied from the belt to the scraping portion so that a vibration of the scraping portion is prevented.

According to the present invention, the work for assembling as well as disassembling of the belt cleaner device becomes easy. When assembling, the cleaner head can be attached to the frame by striking downward the strike seat of the concave with a hammer or the like. Then, the anchor of the cleaner head is pressed and inserted through the support hole of the frame.

When disassembling, the cleaner head can be detached from the frame by striking the nail to disengage from the support hole and then striking upward the anchor with a hammer. The nail becomes retracted in the support hole, and the cleaner head can be easily removed from the frame by pulling the anchor out the support hole.

BRIEF DESCRIPTION OF THE DRAWINGS

FIG. 2 (a) is a perspective view showing a frame, and FIG. 2 (b) is a vertical sectional view of the frame.

FIG. 3 (a) is a perspective view showing a cleaner head from the back side, and FIG. 3 (b) is a perspective view showing the cleaner head from the front side.

FIG. 7 (a) is a plan view of the cleaner head, and FIG. 7 (b) is a bottom view of the cleaner head.

FIG. 11 (a), FIG. 11 (b), and FIG. 11 (c) are vertical sectional views showing the attachment process of the cleaner head to the frame.

FIG. 12 (a), FIG. 12 (b), and FIG. 12 (c) are vertical sectional views showing the removing process of the cleaner head from the frame.

DESCRIPTION OF PREFERRED EMBODIMENTS

Embodiments of the belt cleaner device according to the present invention are described in detail, referring to drawings.

Figure 1:
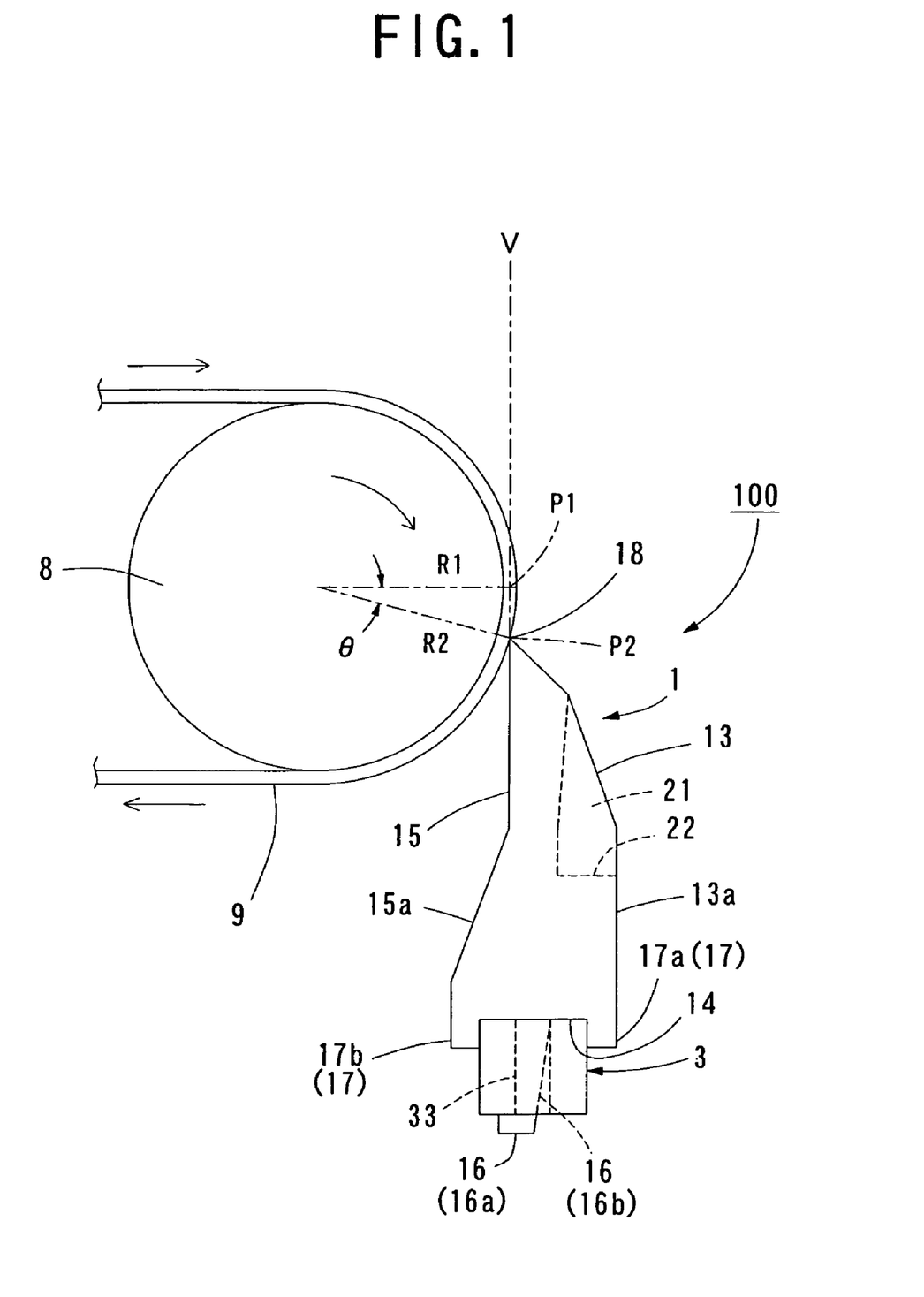
FIG. 1 is a side view showing an embodiment of a belt cleaner device according to the present invention.

FIG. 1 shows a belt cleaner device 100 according to the present invention. An endless conveyer belt 9 is wound circularly between a driving pulley 8 and a following pulley (not shown). The conveyor belt runs in a circle between the pulleys in the direction as shown by an illustrated arrow. The belt cleaner device 100 comprises one or more cleaner heads 1 which scrape off any leavings adhered on the belt surface, and a frame 3 on which the cleaner heads 1 are mounted. As shown, the belt cleaner device 100 is installed adjacent to the conveyer belt 9 at the belt portion winding around the pulley 8. A scraping portion 18 at the upper end of the cleaner head 1 extends in the transverse direction of the conveyor belt and is contacted with the belt surface. The leavings on the belt surface are scraped off by the scraping portion 18 and fallen down through a front wall 13 of the cleaner head 1. The word "front" concerning to the belt cleaner device 100 means the part located in the upper stream side of the running direction of conveyer belt 9, and the word "back" means a part opposite to the front, i.e. the part located in the lower stream side of the running direction of conveyer belt 9.

(Structure of the Frame)

Figure 2A:
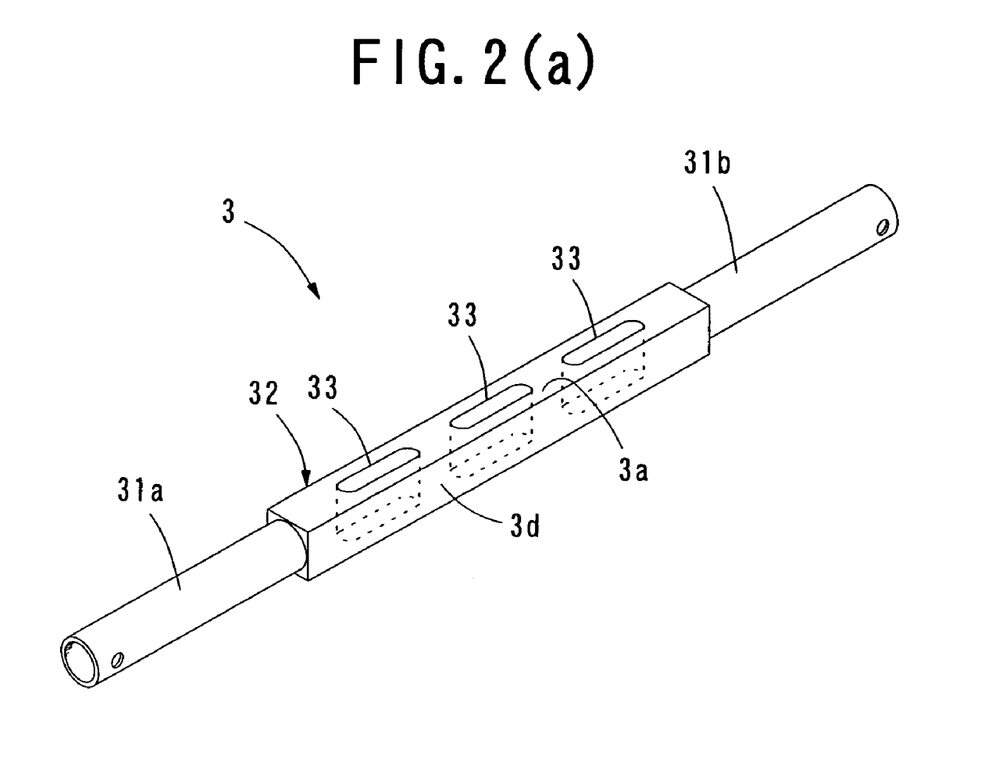
Figure 2B:
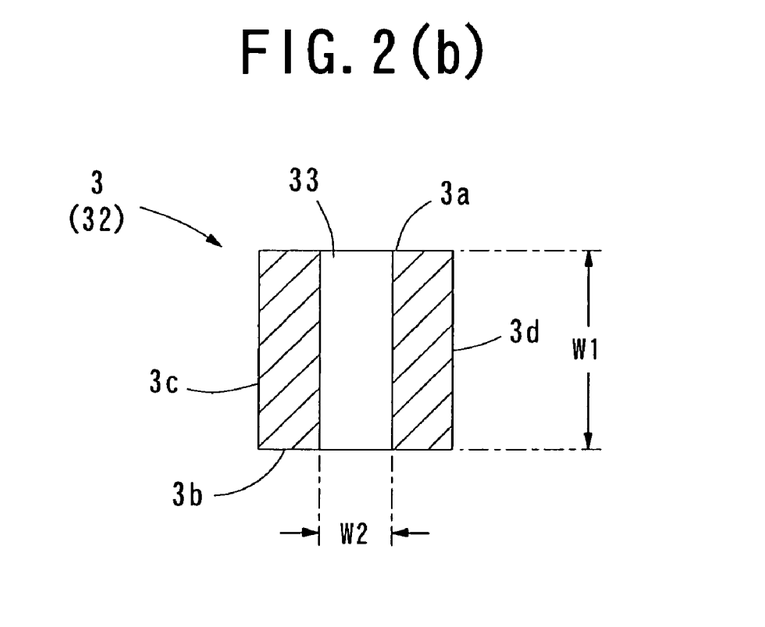

FIG. 2 shows the frame 3. As shown in FIG. 2 (a), the frame 3 comprises a longitudinally extending member which is fixed at its both ends to a pair of supporting brackets (not shown) so that the frame 3 extends in the transverse direction of the conveyor belt.

The center of frame 3 is provided with supporting means 32 of a rectangular shape in cross section. The both ends of the frame 3 is provided with a pair of extensions 31a and 31b of a circular shape in cross section which are extended from the both sides of said supporting means 32. The extensions 31a and 31b are mounted on said supporting brackets.

Said supporting means 32 provides the upper surface with a flat support face 3a on which the cleaner heads 1 are mounted. Support holes 33 are formed vertically through said supporting means 32. Upper openings of the holes 33 are located on the support face 3a. In FIG. 2 (a), although three support holes 33 are illustrated with the predetermined interval in the longitudinal direction (namely, transverse direction of conveyer belt 9) of the frame 3, the number is not limited.

FIG. 2 (b) shows the vertical section of the supporting means 32 of the frame 3. The supporting means 32 is provided with said support face 3a and an undersurface 3b respectively on the up-and-down flat surfaces, and with a front face 3d and a back face 3c respectively on the front and back flat surfaces. The supporting holes 33 are positioned in the middle between the front and back edges of the support face 3a preferably.

(Structure of the Cleaner Head)

FIGS. 3 to 9 show the cleaner head 1. The cleaner head 1 is made of an elastic material such as urethane rubber or the like that comprises a head body 10 and attaching means 11 provided below said head body 10.

The head body 10 has a rear wall 15 directed to the lower stream of the conveyer belt 9 and a front wall 13 directed to the upper stream. The scraping portion 18 is formed in the upper end of the head body 10 in a manner that a thickness of the body 10 is reduced to form an acute upper edge. However, a wear-resistant tip may be attached to the upper end of the head body 10 to form a scraping portion 18 as hereinafter described.

The head body 10 is provided with a flat contact face 14 on its undersurface. The contact face 14 is supported by the support face 3a of the frame 3 by face to face contact. As a result, the cleaner head 1 attached to the frame 3 is prevented from rotating about the running direction of belt 9. The illustrated example shows the support face 3a and the contact face 14 having flat horizontal planes mutually met together though, the present invention is not limited to such illustrated features.

The cleaner head 1 inclines the front wall 13 of head body 10. That is, the thickness of head body 10 becomes thick gradually from the scraping portion 18 toward the bottom. The lower part 13a of the front wall 13 is formed substantially parallel to a vertical line V (see FIG. 1). The rear wall 15 of the head body 10 forms the vertical wall which substantially meets the vertical line V extended from the scraping portion 18, and a slope 15a is formed downward from the lower end of the vertical wall. That is, the thickness of head body 10 becomes thick gradually downward by the slope 15a.

Figure 3A:
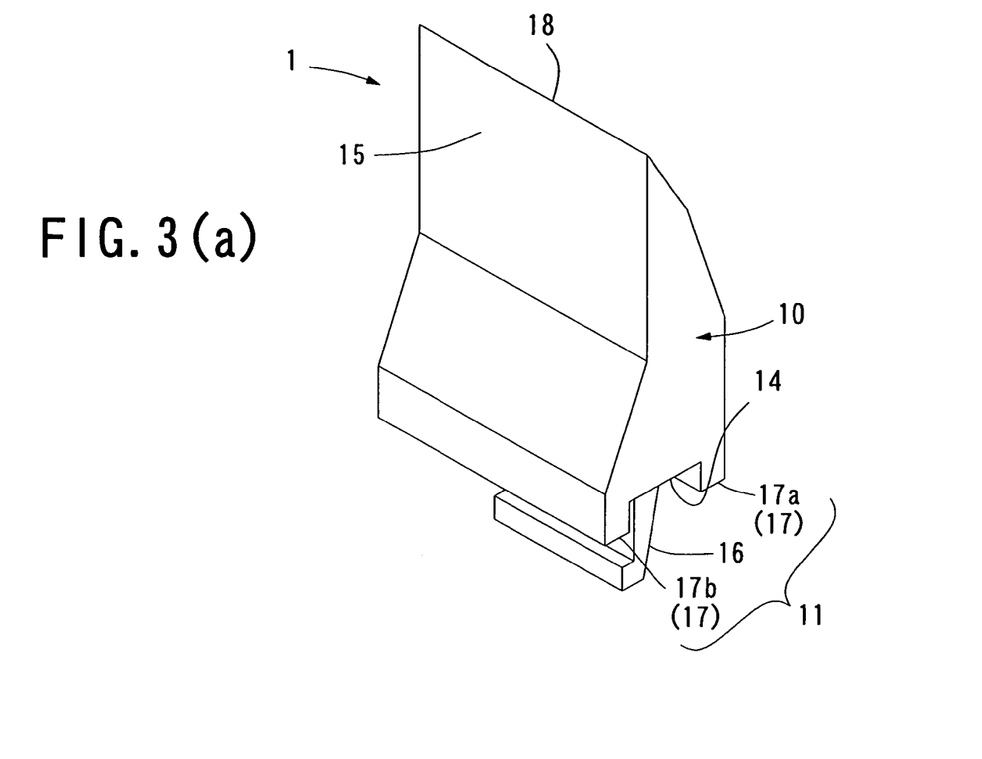
Figure 3B:
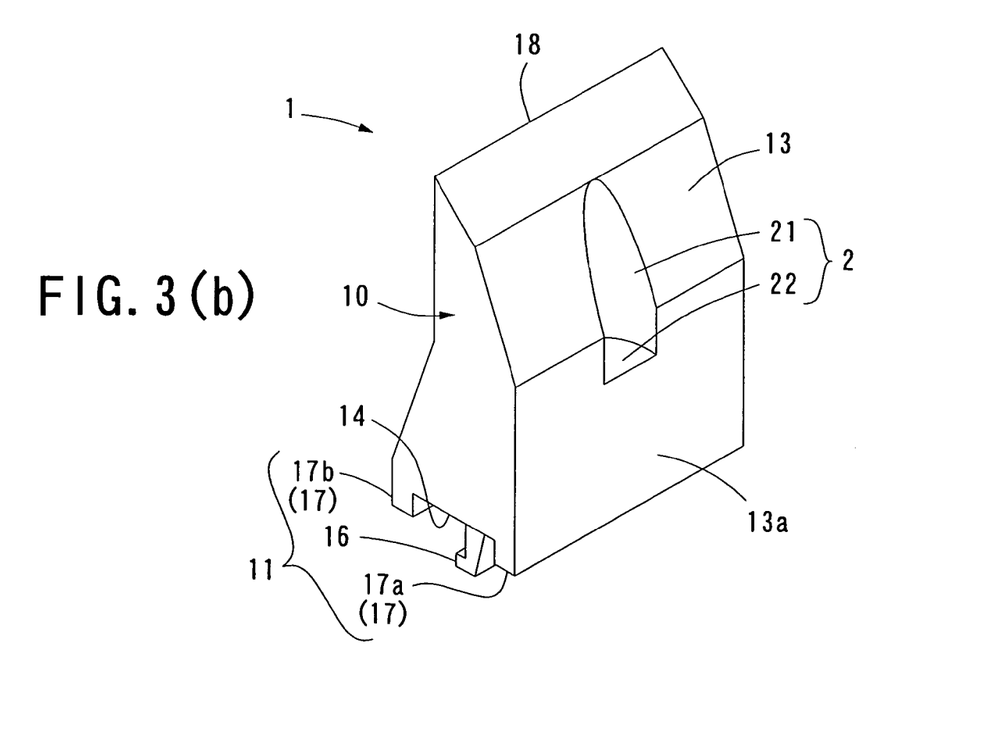
Figure 4:
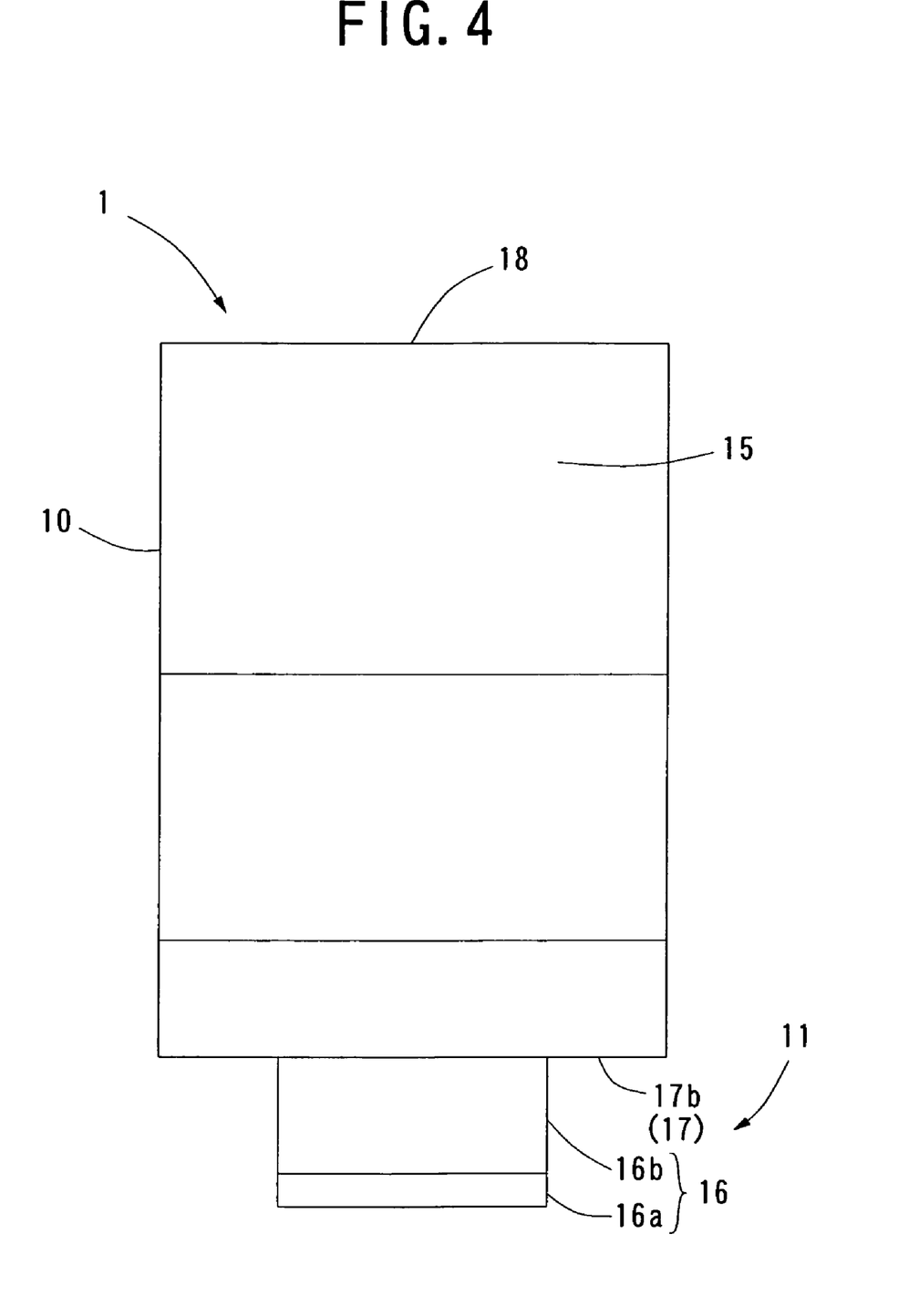
FIG. 4 is a rear view of the cleaner head.
Figure 5:
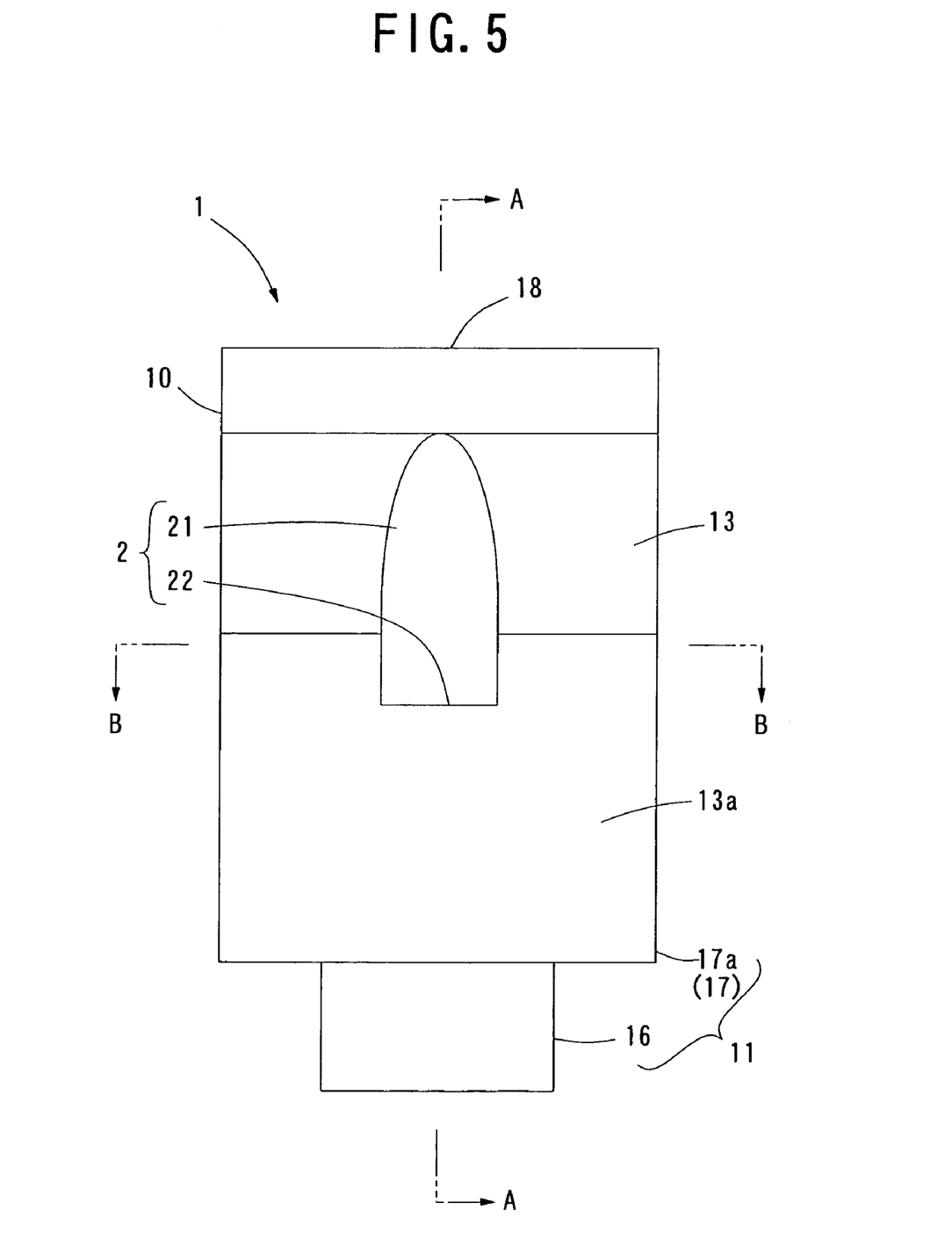
FIG. 5 is a front view of the cleaner head.

The front wall 13 of the head body 10 is provided with strike receiving means 2. The strike receiving means 2 comprises a concave 21 formed in the center of the front wall 13. A flat strike seat 22 is formed in the bottom of the concave 21. The upper space of the strike seat 22 is opened wide through the concave 21. Since the concave 21 is cut in the center of the front wall 13 of the head body 10 as shown in FIG. 3 (b), the strike seat 22 positions near the center of gravity of the head body 10. In other words, the strike seat 22 forms a flat plane parallel to the contact face 14. Therefore, when the strike seat 22 is struck or hit with a hammer or the like as hereinafter mentioned, the striking force is given equally to the contact face 14 on the undersurface of head body 10. The attaching means 11 below the head body 10 comprises an anchor 16 projecting downward from a center of the contact face 14, and a pair of holding portions 17 (17a, 17b) suspended from the front and back edges of the contact face 14. When the anchor 16 is pushed insert through the support hole 33, the holding portion 17 engages with the front and back edges of the support face 3a. The illustrated example shows the holding portions 17 formed by a pair of ribs 17a and 17b along with the front and back edges of the contact face 14, the holding portion 17 may be formed by one of ribs 17a and 17b.

Figure 6:
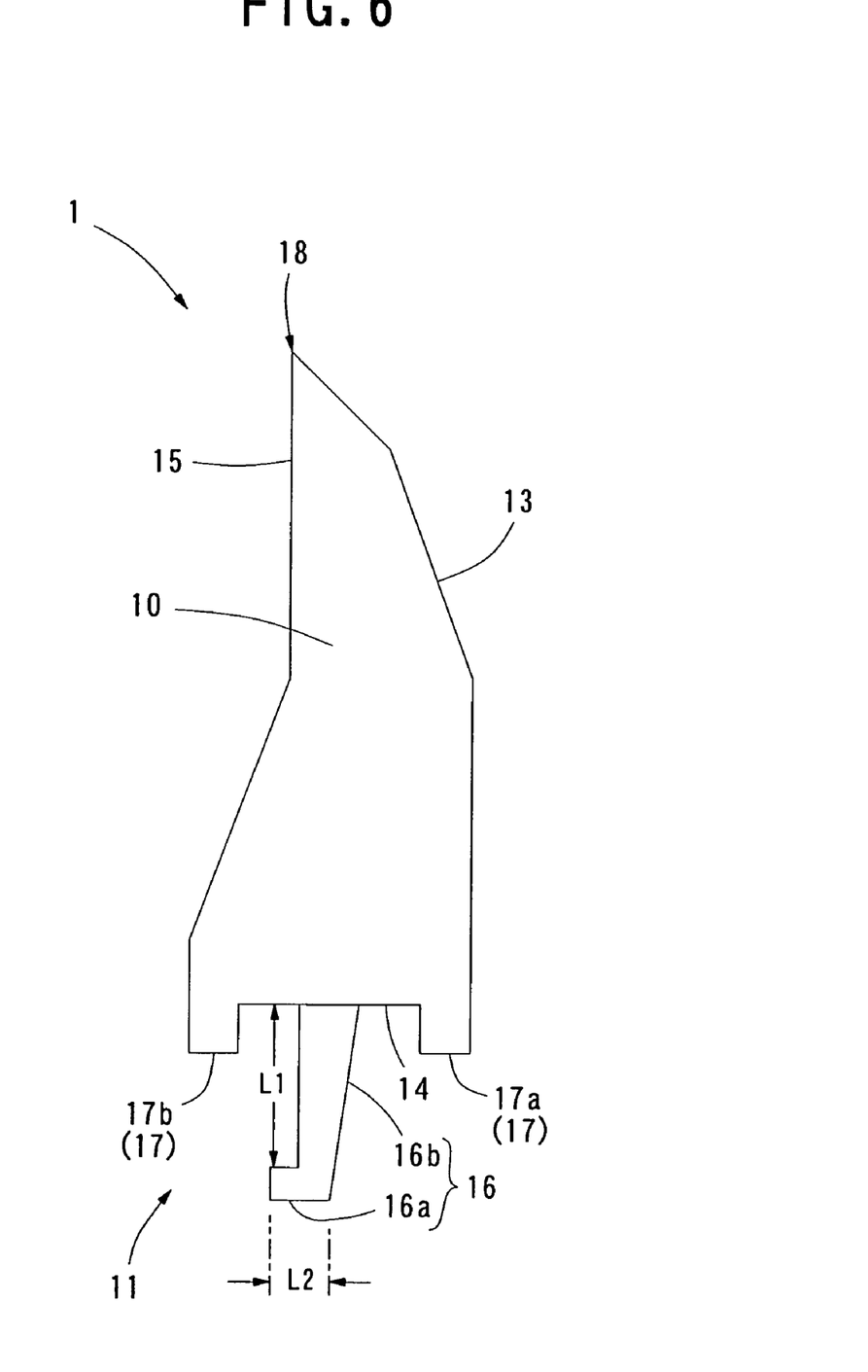
FIG. 6 is a side view of the cleaner head.
Figure 7A:
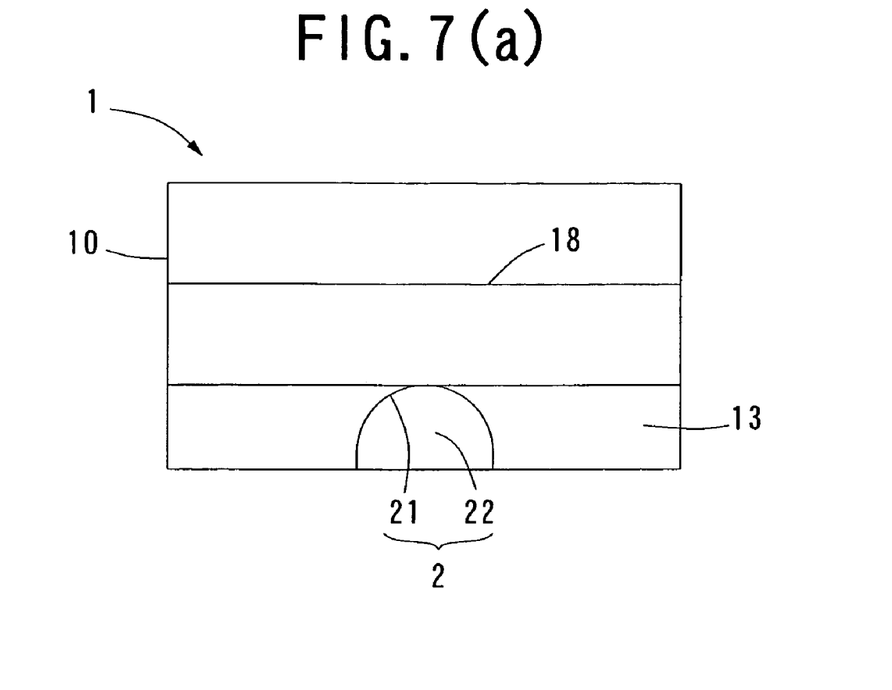
Figure 7B:
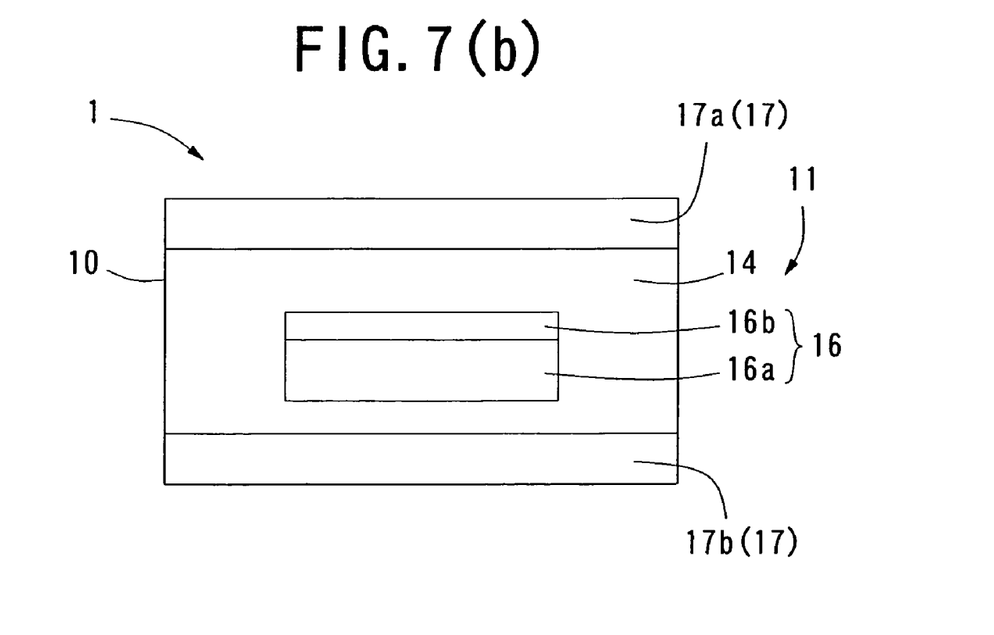
Figure 8:
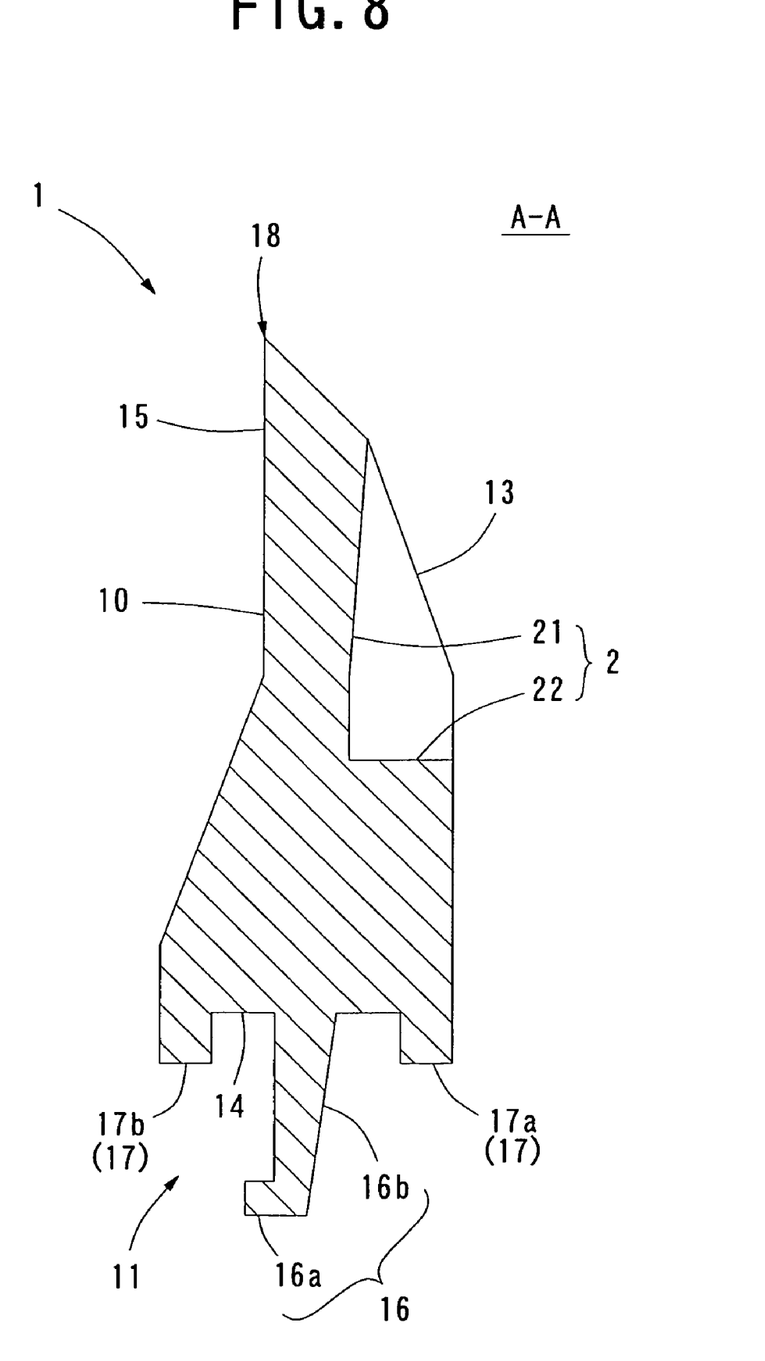
FIG. 8 is a vertical sectional view of the cleaner head along with the line A—A of FIG. 5.
Figure 9:
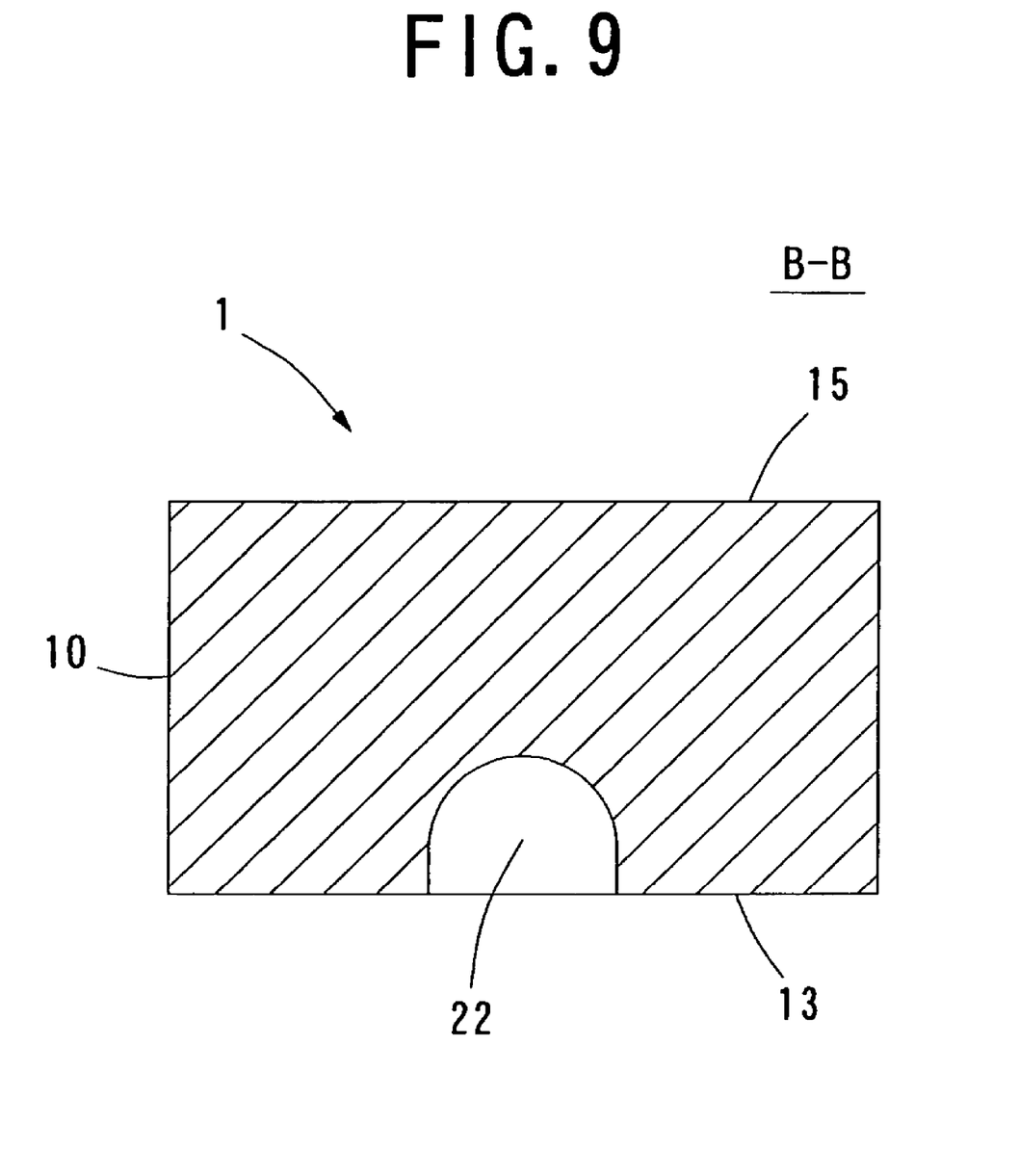
FIG. 9 is a lateral cross sectional view of the cleaner head along with the line B—B of FIG. 5.

As shown in FIGS. 6 to 8, the anchor 16 is provided with a leg 16b and a nail 16a. The leg 16b is extended downward from the contact face 14. The nail 16a is projected in the bending direction from the end of the leg 16b. As such, the anchor 16 has a L-shaped configuration so that the leg 16b is inserted with pressure through the support hole 33 of the frame 3, then the nail 16a goes out the support hole 33 and engages with the undersurface 3b of the frame 3.

The anchor 16 including the leg 16b and the nail 16a is molded integral with the head body 10 by an elastic material. As shown, the back of the leg 16b forms a vertical face, but the front of the leg 16b has a taper face by forming the thickness of the leg 16b gradually thin downward. The taper face extends to the lower end of the nail 16a.

In the illustrated embodiment, height L1 of the vertical plane of the back of leg 16b is substantially the same as the up-and-down directed length W1 of the support hole 33 of the frame 3. The length L2 of the nail 16a including the lower end of leg 16b is substantially the same as the front and back directed width W2 of the support hole 33.

The holding portions 17 (17a, 17b) project from both front and back edges of the contact face 14 and extend in the longitudinal direction of the frame 3. Having contacted the contact face 14 with the support face 3a of the supporting means 32 of the frame 3, the front holding portion 17a holds the corner between the upper face 3a and the front face 3d of the frame 3. Similarly, the back holding portion 17b holds the corner between the upper face 3a and the back face 3c of the frame 3. Therefore, the cleaner head 1 is fixed on the frame 3 so that it may not rotate in the forward direction of conveyer belt 1, and neither of the return direction.

The whole cleaner head 1 is formed by an elastic material under one structure including the head body 10, the anchor 16 and the holding portion 17. It is not necessary to assemble plural parts to form the cleaner head 1. It can be manufactured at low cost by one molding process.

Figure 10:
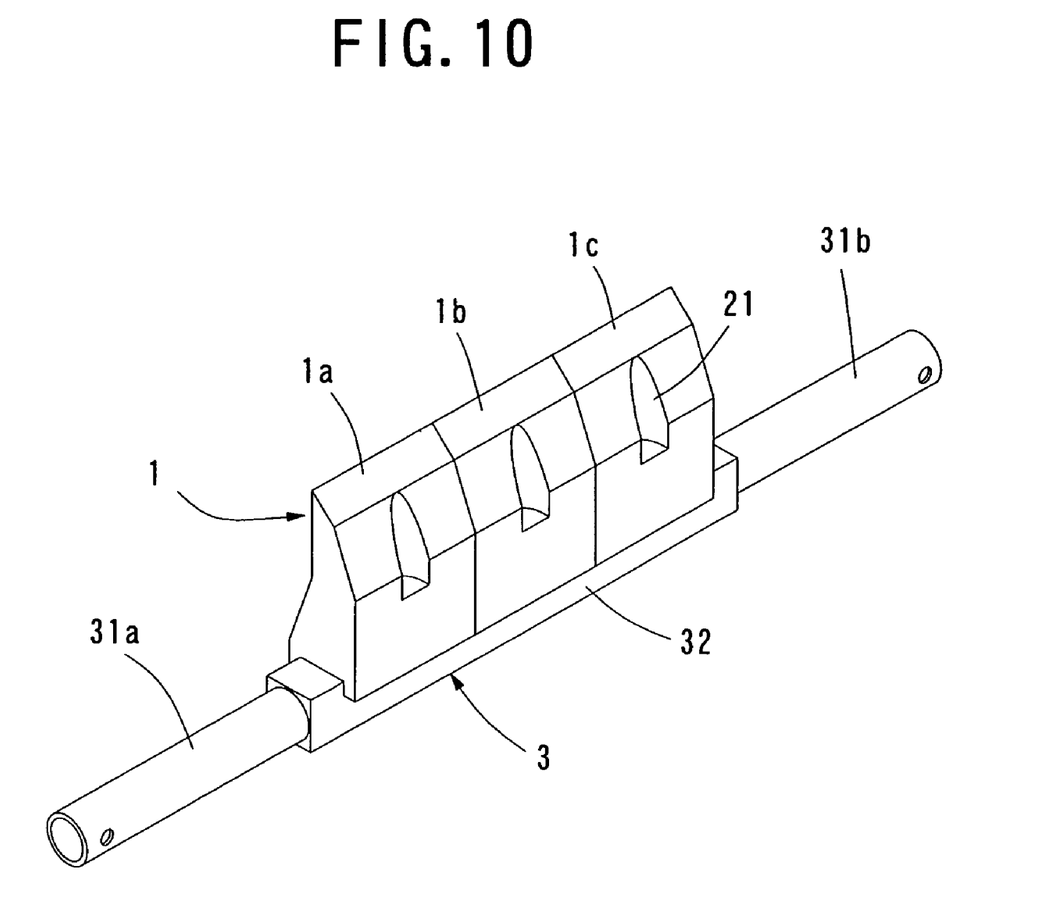
FIG. 10 is a perspective view of the device in which the cleaner heads are attached to the frame.

FIG. 10 shows the assembled belt cleaner device, and two or more cleaner heads 1 (1a, 1b, 1c) are mounted on the supporting means 32 of the frame 3. As mentioned above, the holding portions 17 of the cleaner head 1 engage with the supporting means 32 at the corners. The anchor 16 is fixed to the supporting means 32 with the leg 16b inserted through the support hole 33 and the nail engaged with the undersurface 3b of the supporting means 32. In this state, the contact face 14 of the cleaner head 1 contacts with the support face 3a of the supporting means 32 by face to face contact.

According to the present invention, either the work for attaching the cleaner head 1 to the frame 3 or the work for detaching the cleaner head 1 form the frame 3 can be done quickly, and easy. This point is described below.

(Work for Attaching a Cleaner Head to a Frame)

Figure 11A:
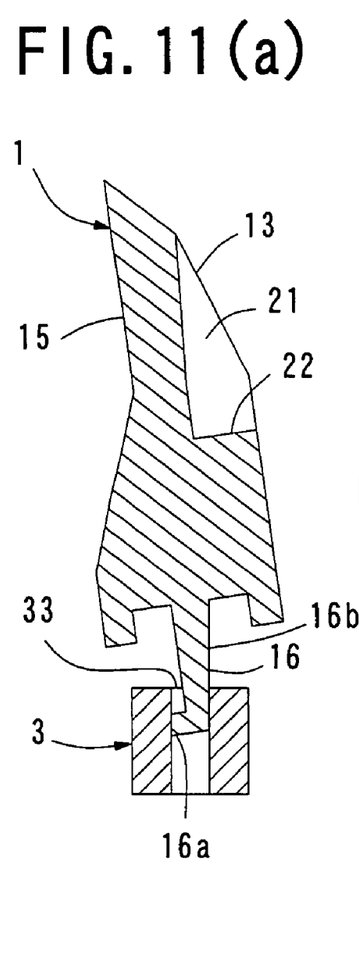
Figure 11B:
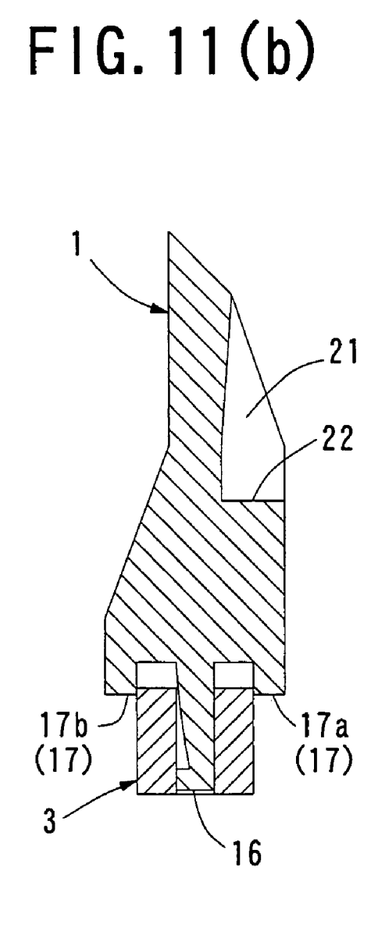
Figure 11C:
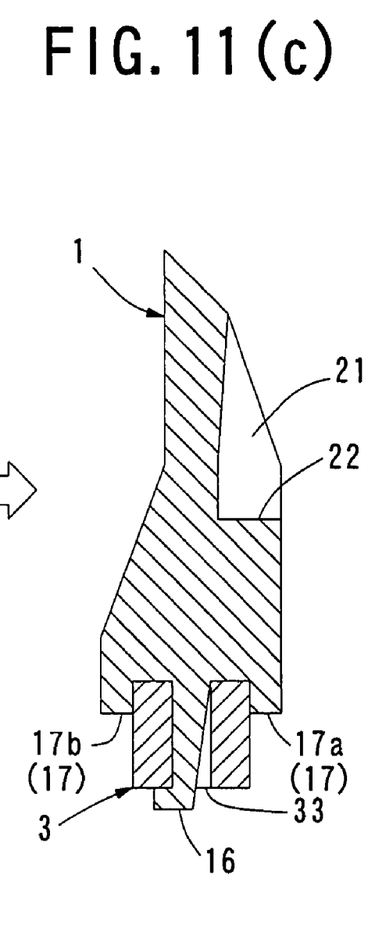

A process of work for attaching the cleaner head 1 to the frame 3 is shown in FIG. 11 (a), (b), and (c) consecutively.

Firstly, the cleaner head 1 is pushed toward the support face 3a of the frame 3 while the anchor 16 is inserted in the support hole 33, thereby the nail 16a is inserted into the support hole 33 with pressure while contacting the nail 16a with the inner wall of the hole 33 as shown in FIG. 11 (a).

When the lower end of the holding portions 17 (17a and 17b) get in contact with and holds the corners of the supporting means 32, the head body 10 takes a standing posture to the supporting means 32 as shown in FIG. 11 (b). At this time, the leg 16b of the anchor 16 is deformed resiliently and distorted in the support hole 33. Since the anchor 16 generates frictional force in contact with the inner wall of the support hole 33, it becomes difficult to insert the anchor 16 further downward.

Then, the strike seat 22 of the concave 21 in the front wall 13 of the cleaner head 1 is struck with a hammer or the like. Thereby, the leg 16b of the anchor 16 is pressed fit down the support hole 33. As soon as the nail 16a falls out from the support hole 33, the anchor 16 carries out an elastic restoration from the foregoing distorted shape to the original shape so that the nail 16a engages with the undersurface 3b of the frame 3 as shown in FIG. 11 (c).

FIG. 11 (c) shows the state where attachment of the cleaner head 1 has completed. The anchor 16 is fixed to the supporting means 32 with the leg 16b inserted through the support hole 33, and with the nail 16a engaged with the undersurface 3b of the frame 3. Therefore, the anchor 16 may no longer be pulled out from the support hole 33. The holding portions 17a and 17b hold the front and back corners of the supporting means 32. Therefore, the cleaner head 1 does not move with respect to the support face 3a of the frame 3. Also the cleaner head 1 is not rotated about the running direction of the belt.

Thus, such mounting work of the cleaner head 1 on the frame 3 may be performed simply easily and quickly.

(Work for Removing a Cleaner Head From a Frame)

Figure 12A:
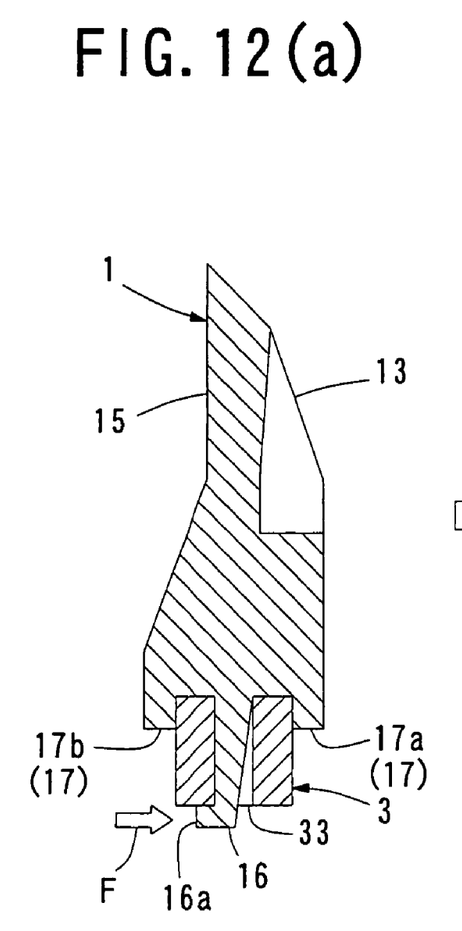
Figure 12B:
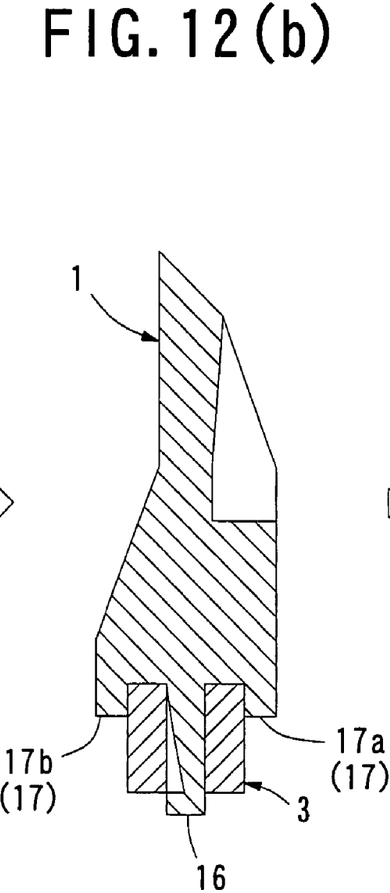
Figure 12C:
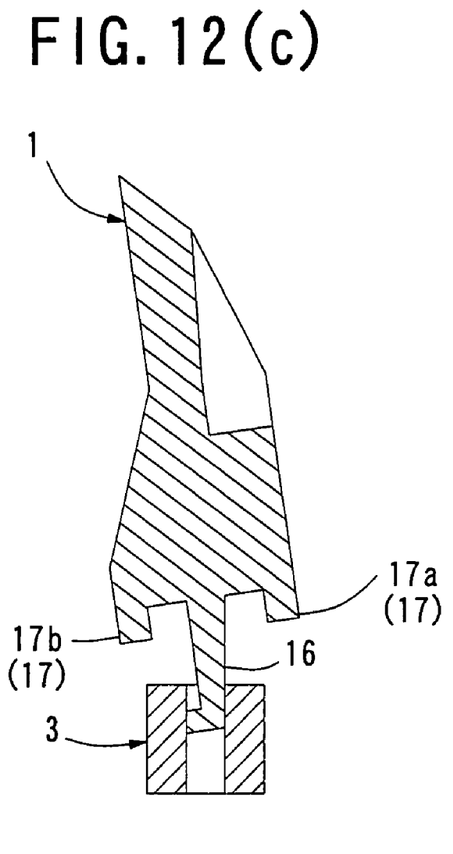

A process of work for detaching the cleaner head 1 from the frame 3 is shown in FIG. 12 (a), (b), and (c) consecutively.

As shown in FIG. 12(a), the nail 16a of the anchor 16 is horizontally struck with a hammer or the like in the direction of arrow (F) as illustrated. As a result, the nail 16a moves from the undersurface 3b to the support hole 33 by deformation of the leg 16b. Subsequently, the nail 16a is struck upward with a hammer or the like, then the nail 16a advances into the support hole 33.

Under the state that the nail 16a is retracted into the support hole 33 as shown in FIG. 12 (b), the holding portions 17a and 17b are struck upward with a hammer or the like. Then, the holding portions 17a and 17b become apart from the frame 3, and the nail 16a and the leg 16b move up inside the support hole 33.

By repeating such upward striking if necessary, the anchor 16 is pulled out from the support hole 33, and the cleaner head 1 is removed from the frame 3 as shown in FIG. 12 (c).

Thus, such removing work of the cleaner head 1 from the frame 3 may be performed simply easily and quickly.

(Operation of the Belt Cleaner Device)

The belt cleaner device 100 is installed adjacent to the conveyor belt 9 at the belt portion winding around the pulley 8 as above-mentioned. As shown in FIG. 1, the conveyer belt 9 is switches the running direction on the pulley 8 at a switching point P1 which crosses a horizontal line R1 extending in the level radial direction of the pulley 8. The scraping portion 18 of the cleaner head 1 is contacted with the conveyer belt 9 at a portion P2 which is near the switching point P1 but below this point P1.

When setting a line R2 extending between the center of the pulley 8 and the scraping portion 18, the interior angle θ between two lines R1 and R2 is set within a range from 10 (ten) degrees to 20 (twenty) degrees, preferably the angle θ is set 15 (fifteen) degrees. The rear wall 15 of the cleaner head 1 is aligned with the vertical line V crossing the scraping portion 18.

Therefore, the vertically positioned rear wall 15 opposes against the load applied to the scraping portion 18 from the running conveyer belt 9. Thereby, a vibration of the cleaner head 1 is prevented and the scraping portion 18 is made to contact with suitable pressure with the surface of conveyer belt 9.

In case that if the rear wall 15 of the cleaner head 1 inclines toward the scraping portion 18 (inclines in the direction to the upper left from the illustrated position in FIG. 1), the head body 10 tends to cause a moment to press the scraping portion 10 against the belt surface (a moment in an anti-clock wise direction in FIG. 1), and the head body 10 may deform in this direction. As a result, the scraping portion 18 may vibrates by unevenness of the belt surface. For this reason, for example, when providing the scraping portion 18 with a wear-resistant tip of a hard metal or the like, the scraping portion 18 may bite the belt surface and cause a risk of cutting the belt.

In comparison with the foregoing, according to the present invention, the scraping portion 18 is supported by the rear wall 15 which aligns with the vertical line V Therefore, moments mentioned above are not produced. A vibration of the scraping portion 18 is small and there is no risk of cutting the belt.

The cleaner head 1 is formed in one piece with an elastic material so as to be resiliently deformed so that the scraping portion 18 always contacts with the belt surface by uniform pressure, even when the belt surface has any irregular unevenness by partial wear, for example. The leavings on the belt surface are scraped off in good conditions.

The leavings scraped off by the scraping portion 18 fall down along the front of the cleaner head 1 and are collected beneath the belt cleaner device.

(Second Embodiment)

Figure 13:
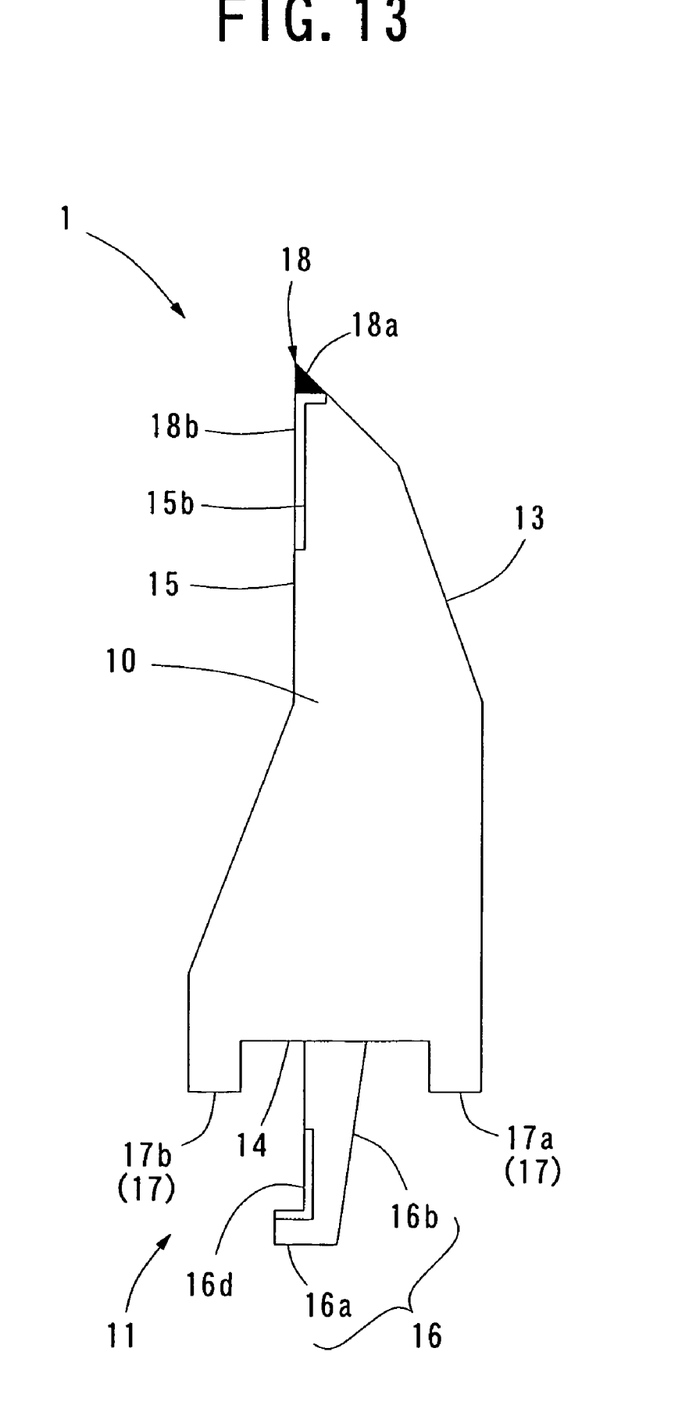
FIG. 13 is a side view showing a second embodiment of the cleaner head according to the present invention.

FIG. 13 shows a second embodiment of the cleaner head 1 according to the present invention. The same reference numerals show the same portions as cleaner head 1 mentioned above. In the second embodiment, the scraping portion 18 of the cleaner head 1 provides with a tip 18a which is formed separately from the head body 10. The anchor 16 provides the bending portion between the leg 16b and the nail 16a with a fitting 16d.

First, the tip 18a is described. A depression 15a is formed in the upper part of the rear wall 15 of the cleaner head 1, and a seat plate 18b is laid on the depression 15b. In case that the head body 10 is molded with an elastic material, so-called insert molding of the seat plate 18b may be carried out. In case that the head body 10 is molded by vulcanizing rubber material for example, the seat plate 18b is set in the molds and embedded in the depression 15a simultaneously with the molding process.

A wear-resistant tip 18a, such as a hard material of tungsten carbide for example, is provided with the upper end of the seat plate 18b. The tip 18a forms the upper end of the rear wall 15.

The material of the tip 18a may be selected among any wear-resistant materials. In another embodiment, the scraping portion 18 comprising the seat plate 18b having the tip 18a may be detachably attached to the depression 15b by bolts and nuts for example. In this case, the scraping portion 18 can be exchanged when it wears out.

Next, the fitting 16d is described. The fitting 16d is formed by a L-shaped plate of non-flexible material, such as a metal plate, and is laid at the bending portion between the leg 16b and the nail 16a. In case that the head body 10 is molded with an elastic material, so-called insert molding of the fitting plate 16b may be carried out.

By providing the non-flexible fitting 16d, the anchor 16 can not be deformed at the portion between the leg 16b and the nail 16a. On the other hand, the leg 16b is still deformable at the upper portion above the fitting 16d.

When inserting or detaching the anchor 16 to the support hole 33, the nail 16a may be inserted in or pulled out the support hole 33 by deforming the leg 16b. However, in the state that the leg 16b has been inserted through the support hole 33, the nail 16a engages with the undersurface of the frame 3. Since the nail 16a can not be deformed with the fitting 16d so that it keeps engaging and assures the locked state unless it is struck with a hammer as mentioned above.

Although the illustrated example shows the cleaner head 1 having both of the seat plate 18b having the tip 18a and the fitting 16d, the present invention may provide only one of them.

(Third Embodiment)

Figure 14:
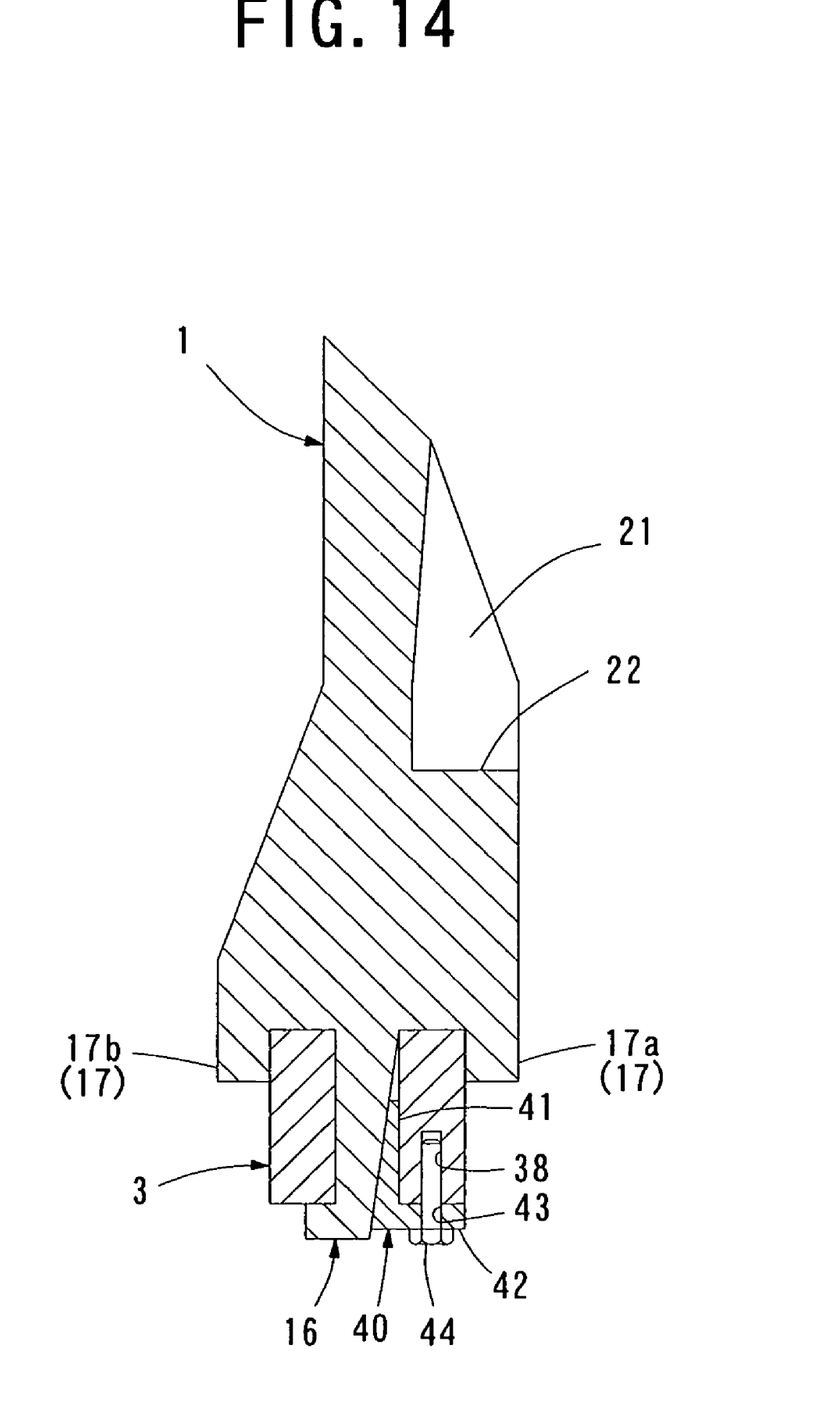
FIG. 14 is a vertical sectional view showing a third embodiment in which a wedge is used to fix the cleaner head to the frame.

FIG. 14 shows a third embodiment of the present invention. The same reference numerals show the same portions as cleaner head 1 mentioned above.

As mentioned above, the anchor 16 of the cleaner head 1 is formed in the taper shape which makes thickness thin gradually as it goes downward. For this reason, when the anchor 16 is inserted through the support hole 33, a crevice will be produced between the inner wall of the support hole 33 and the tapered front of the leg 16b.

A wedge member 40 is put into the crevice. The wedge member 40 is provided with a filling portion 41 and a fixing portion 42 which is bent from the filling portion 41. The filling portion 41 has a wedge shape to be inserted in the tapered crevice. The fixing portion 41 meets the undersurface 3b of the frame 3 when the filling portion 41 is inserted in the crevice.

The frame 3 is provided with a screw hole 38 in the undersurface 3b. The fixing portion 41 is provided with a hole 43 corresponding to said hole 38.

The wedge member 10 is fixed to the frame 3 in a manner that the filling portion 41 is inserted in the crevice, and a bolt 44 is screwed into the screw hole 38 through the hole 43.

Therefore, the anchor 16 is fixed to frame 3 by the wedge member 40. The cleaner head 1 can not be removed from the frame 3 unless the wedge member 40 is pulled out.

The invention claimed is:

1. A belt cleaner device comprising a frame (3) extending in a transverse direction of a conveyor belt (9) and one or more cleaner heads (1) mounted on said frame (3), said cleaner head (1) having a scraping portion (18) on the upper end thereof which contacts with the surface of the running conveyor belt (9), whereby leavings struck on the belt are scraped off and fallen downward through a front wall (13) of said cleaner head (1) characterized in that:

said frame (3) provides a support face (3a) on the upper surface thereof and a support hole (33) therethrough having its opening on said support face (3a), said cleaner head (1) provides a contact face (14) on the undersurface thereof corresponding to said support face (3a) so that said cleaner head (1) is supported so as not to be rotated about the running direction of the belt by contacting said contact face (14) and said support face (3a) with each other, and said cleaner head (1) being provided with an anchor (16) projecting downward from said contact face (14) through said support hole (33) so that said cleaner head is fixed to said frame (3) by said anchor (16) having been inserted through said support hole (33) due to downward pressure applied to said anchor (16), said anchor (16) including a leg (16b) and a nail (16a) bent from the end of said leg (16b). said leg (16b) being formed with an elastic resilient material integrally with said cleaner head (1), wherein said anchor (16) is fixed to the frame (3) in such a manner that said leg (16b) having resiliently deformed during insertion of the nail (16a) and the leg (16b) with downward pressure through said support hole (33), has been restored to its original shape after passage of the nail (16a) out from the hole (33) and is in engagement with the undersurface of the frame (3), and wherein said cleaner head (1) further has a concave (21) in at least one of said front wall (13) and a rear wall (15) opposite thereto, said concave (21) having a strike seat (22) at the bottom thereof which forms a flat plane parallel to said contact face (14) and is positioned near a center of gravity of the cleaner head (1), whereby said anchor (16) has been pressed and inserted through said support hole (33) by striking said strike seat (22) with a hammer or the like to produce said downward pressure.

2. A belt cleaner device define in claim 1, wherein said frame (3) provides supporting means (32) of a substantially rectangular shape in cross section which forms said support face (3a) and an undersurface (3b) respectively on up-and-down flat faces thereof, and another flat surface is formed on at least one of front and back faces (3d) (3c) of said supporting means (32), and wherein said cleaner head (1) provides a holding portion (17) suspended from at least one of front and back edges of said contact face (14), whereby said holding portion (17) engages with said flat surface formed on at least one of the front and back faces (3d) (3c).

3. A belt cleaner device defined in claim 1, wherein said belt cleaner device is installed so that said scraping portion (18) contacts with a portion (P2) of the belt (9) wound around a pulley (8), said portion (P2) being near and below the switching point (P1) where the running direction of the belt is switched on the pulley (8), and said rear wall (15) of the cleaner head (1) is aligned with a vertical line (V) extending from said scraping portion (18).

4. A belt cleaner device defined in claim 1, wherein said leg (16b) forms a back vertical face and a front taper face, and said taper face is provided by the thickness of the leg (16b) gradually decreasing downward to the lower end of said nail (16a).

5. A belt cleaner device defined in claim 4, wherein a height (L1) of said vertical face of the leg (16b) is substantially the same as an up-and-down directed length (W1) of said support hole (33), and wherein a horizontal length (L2) of said nail (16a) is substantially the same as a front-and-back directed width (W2) of said support hole (33).

* * * * *